No. 668,588. Patented Feb. 19, 1901.
H. SMITH.
SIGNALING APPARATUS FOR RAILWAY TRAINS.
(Application filed Sept. 18, 1900.)
(No Model.) 8 Sheets—Sheet 1.

Fig. 1.

No. 668,588. Patented Feb. 19, 1901.
H. SMITH.
SIGNALING APPARATUS FOR RAILWAY TRAINS.
(Application filed Sept. 18, 1900.)
(No Model.) 8 Sheets—Sheet 2.

Fig. 2.

No. 668,588. Patented Feb. 19, 1901.
H. SMITH.
SIGNALING APPARATUS FOR RAILWAY TRAINS.
(Application filed Sept. 18, 1900.)

(No Model.) 8 Sheets—Sheet 3.

Witnesses
Inventor
Henry Smith
by James L. Norris
Atty

No. 668,588. Patented Feb. 19, 1901.
H. SMITH.
SIGNALING APPARATUS FOR RAILWAY TRAINS.
(Application filed Sept. 18, 1900.)
(No Model.) 8 Sheets—Sheet 4.

No. 668,588. Patented Feb. 19, 1901.
H. SMITH.
SIGNALING APPARATUS FOR RAILWAY TRAINS.
(Application filed Sept. 18, 1900.)
(No Model.) 8 Sheets—Sheet 5.

Fig. 5.

No. 668,588. Patented Feb. 19, 1901.
H. SMITH.
SIGNALING APPARATUS FOR RAILWAY TRAINS.
(Application filed Sept. 18, 1900.)
(No Model.) 8 Sheets—Sheet 6.

UNITED STATES PATENT OFFICE.

HENRY SMITH, OF LONDON, ENGLAND, ASSIGNOR OF ONE-HALF TO SAMUEL CHARLES COLLINGWOOD FENWICK, OF SAME PLACE.

SIGNALING APPARATUS FOR RAILWAY-TRAINS.

SPECIFICATION forming part of Letters Patent No. 668,588, dated February 19, 1901.

Application filed September 18, 1900. Serial No. 30,433. (No model.)

*To all whom it may concern:*

Be it known that I, HENRY SMITH, a subject of the Queen of Great Britain, residing at 94[a] Somerleyton road, Brixton, London, England, have invented certain new and useful Improvements in Signaling Apparatus for Railway-Trains, of which the following is a specification.

The object of this invention is the improved construction and arrangement of appliances or apparatus for indicating to the driver of a locomotive the gradients and the name of a station or block-box, together with the signals, whether "distant," "semaphore," or "home," and whether they are at "danger" or "line clear," and also recording the position of the various signals during the travel of the train or engine.

The invention will be clearly understood from the following description, aided by the accompanying drawings, in which—

Fig. 3 is a side sectional elevation through the line 2 2 of Fig. 1.

Figure 1:
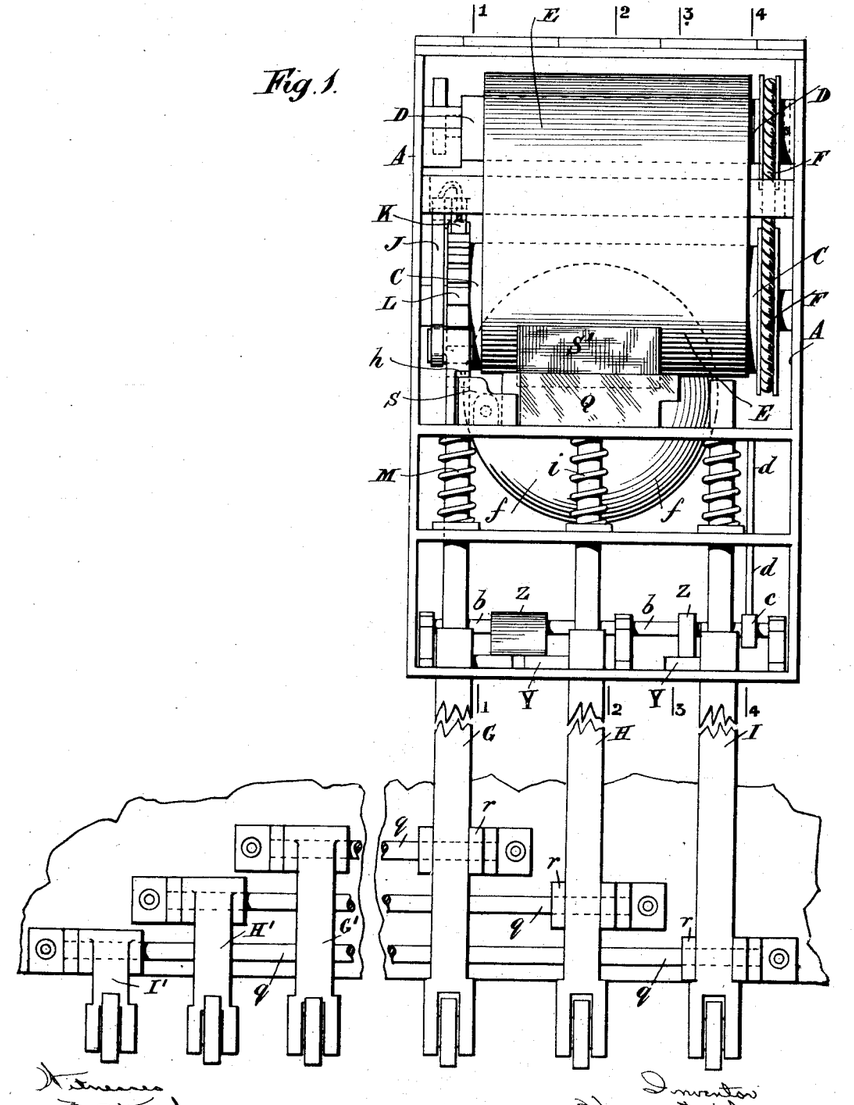
Figure 1 is a front elevation of the indicating and recording appliance, the front of the box being removed.

A is a box or casing affixable to the cabin of a locomotive or in the guards, brake, or other part of a train, as desired. This box A has suitable bearings for carrying rollers B C D, the roller B being provided with a roll of paper, which paper E is passed under the roller C to the roller D, to which it is secured. The paper is printed throughout its length with the names of the stations, the indications—that is to say, "distant," "semaphore," or "home"—of the signals, and the various gradients, according to the route the train is to take for the journey, the paper being removed by the superintendent or other official at the end of the journey and a fresh roll substituted to suit the new route to be traversed by the train. The rollers C and D are belted together, preferably by a band F, Fig. 1, so that they move together.

G H I are rods depending from the apparatus to within a short distance of the ground for actuating, as hereinafter described.

The rod G (see Fig. 2) is in connection with a crank-lever J, which carries at its free end a spring-controlled pawl K, engaging the ratchet-teeth L on the roller C for moving the same when the rod G is actuated, the roller C to shift the paper on the required distance to exhibit through the opening P a fresh indication, a spring M, arranged between brackets, returning the rod G to its normal position.

Figure 2:
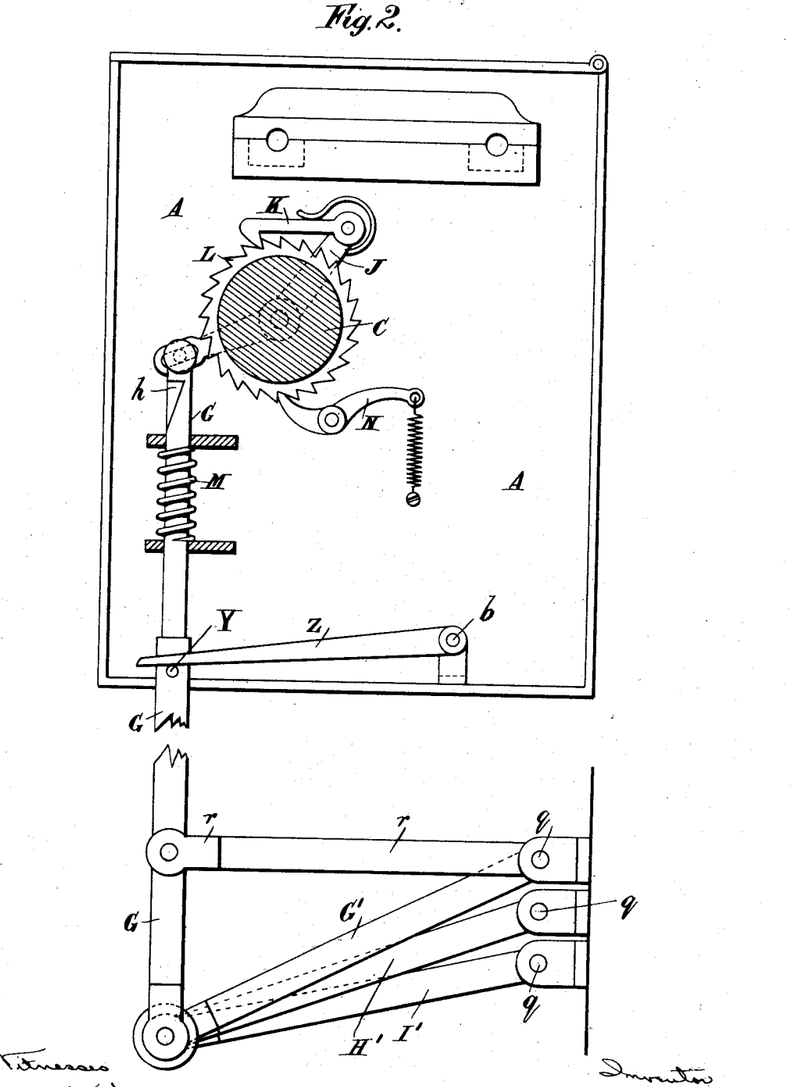
Fig. 2 is a side sectional elevation through the line 1 1 of Fig. 1.

N is a spring-controlled pawl engaging the ratchet-teeth L to prevent a return movement of the roller C.

Figure 4:
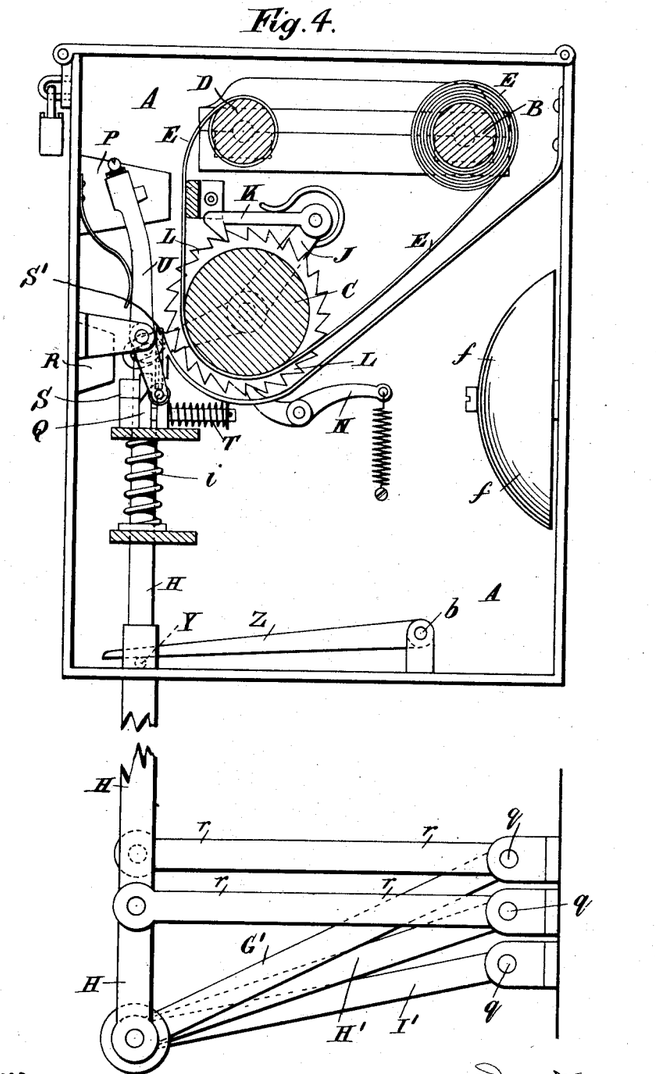
Fig. 4 is a side sectional elevation through the line 3 3 of Fig. 1.
Figure 6:
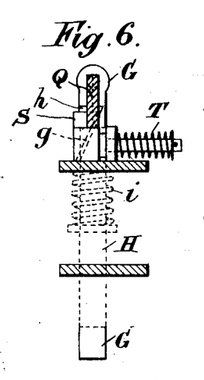
Fig. 6 is a side section of the "danger" or "line-clear" indicating portion of the apparatus.
Figure 7:
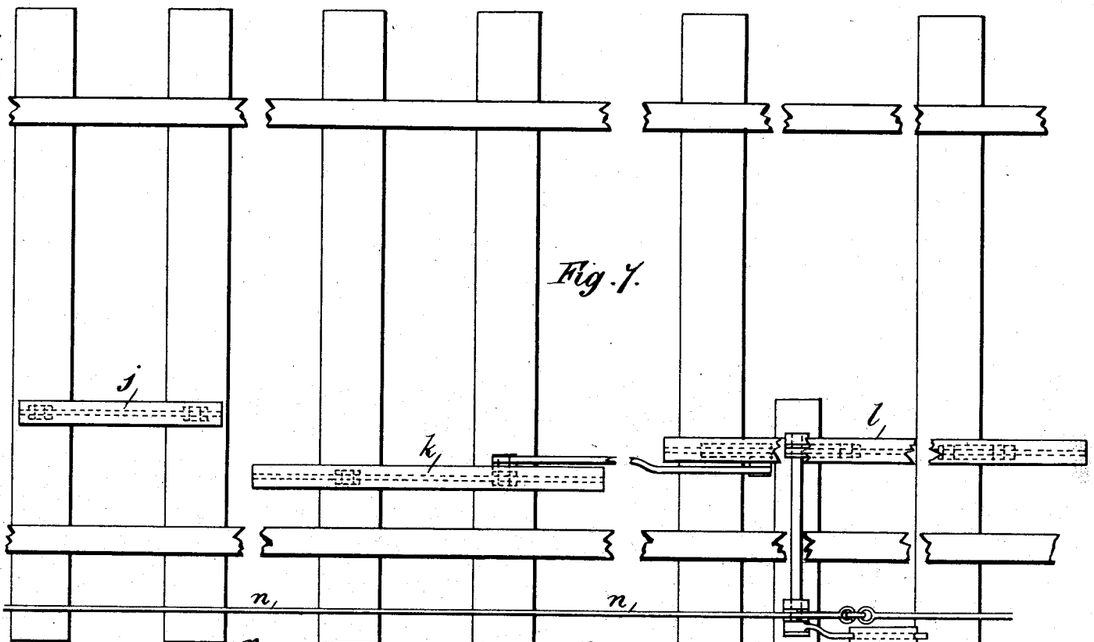
Fig. 7 is a plan, and Fig. 8 a side elevation, of a rail-track, showing the approximate positions of the various devices for operating the appliances shown in the previous figures.
Figure 8:
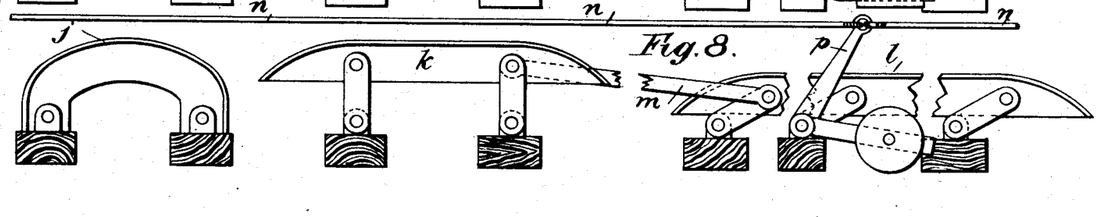
Figure 9:
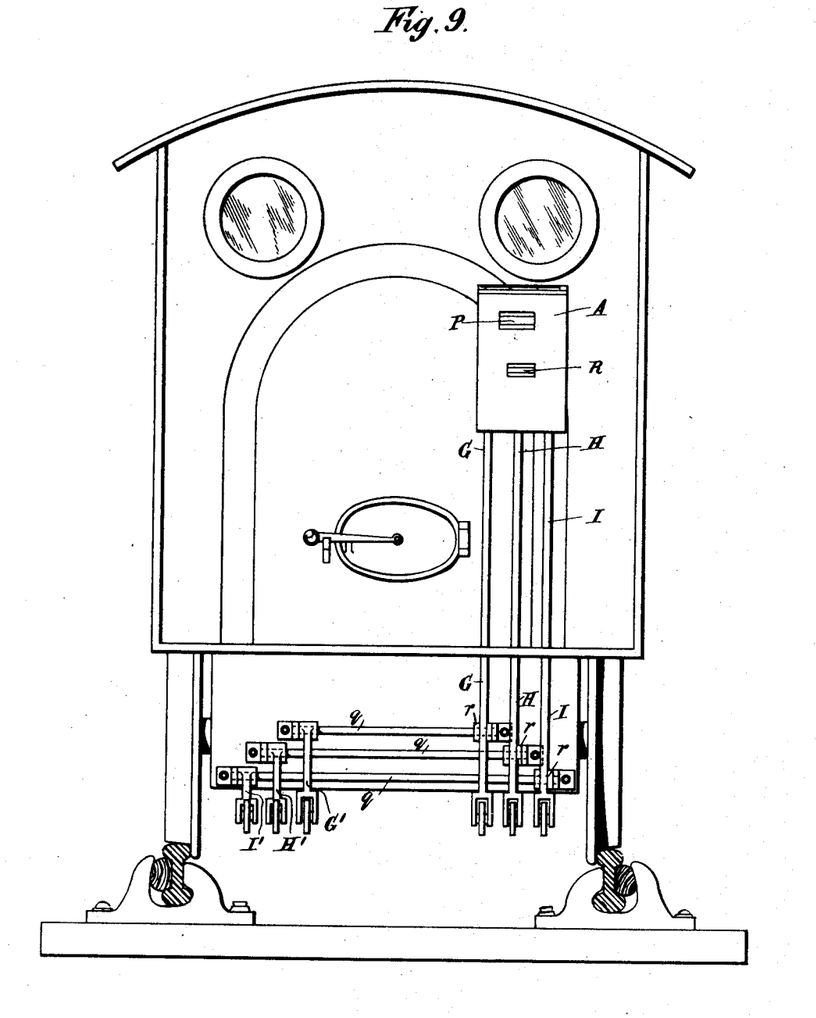
Fig. 9 is an elevation of a locomotive-cabin and showing the approximate position of the apparatus, the operating-rods being constructed for actuation during either direction of travel of the engine.
Figure 10:
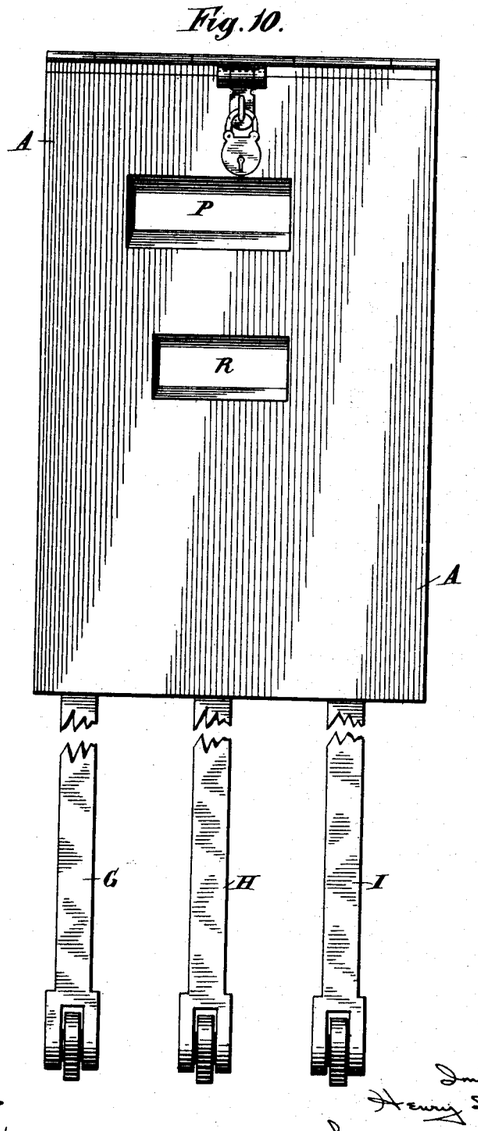
Fig. 10 is an elevation of the casing containing the mechanism and operating-rods.

The rod H (see Figs. 3, 4, and 6) carries a plate or board Q, colored green, and when the rod H is lifted the plate Q will be exhibited at the opening R and locked in that position by reason of the latch-plate S being drawn in under the board Q by the spring T, as shown at Fig. 6.

Pivoted to the front plate of the casing within the same is a spring-controlled rocking lever U, the upper part being provided with an inking or marking device and the lower with a roller, so that as the rod H is raised the roller will ride against the board Q until it comes to an angle-edged opening, when the spring of the lever U will cause the marking end to press upon the paper and mark the same, say, with a green spot, to record that the signal indicated "line clear" when the driver passed that particular signal.

Figure 5:
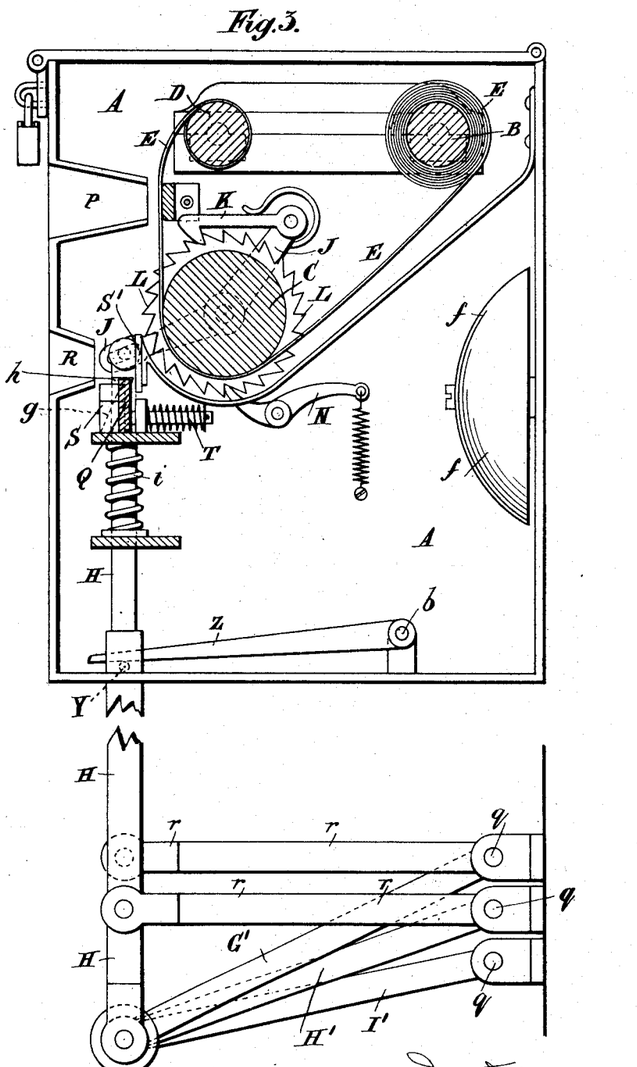
Fig. 5 is a side sectional elevation through the line 4 4 of Fig. 1.

The rod I, Fig. 5, has a nose W at its uppermost end, which in its normal condition holds a rocking lever X (similar to that just described) under the action of its spring and with the marking end away from the paper; but when the rod I is lifted the nose W is removed from contact with the roller end of the rocking lever X for its spring to force the marking end onto the paper to record that the driver had passed the signal when at "danger" by marking on the paper, say, a red spot, against the name of the particular signal printed thereon.

On each of the rods Q H I is fitted a pin or projection Y, either of these when a rod is lifted actuating its respective lever Z, this lever Z being fixed to an axle $b$, carrying at the opposite side an arm or lever $c$, which is hinged to a rod $d$, for actuating a bell mechanism $e$, so that each time either rod is lifted the bell $f$ is struck to warn the driver that the apparatus has been acted upon.

The latch-plate S is provided at the free end with an angled face $g$, so that when the rod G is lifted to exhibit a fresh indication an angled recess $h$ in the rod will engage the angle-face $g$ of the plate and push the latch-plate S away from contact with the plate Q and allow the plate Q and rod H to be returned to their normal positions by the spring $i$.

Between the metals and at the desired distances apart I fit the necessary appliances for actuating the mechanism heretofore described during the travel of the train and preferably before each signal. These appliances consist of a camber $j$, which is fixed to the sleepers and employed for actuating the rod G, a hinged camber $k$ for actuating the rod I, and another pivoted camber $l$ for actuating the rod H, the cambers $k$ $l$ being connected together by a connecting-rod $m$ for actuating from the signal-cabin through the wire $n$ and lever $p$, the wire $n$ being the same which operates the signal, so that the signalman when he moves his signal also moves the cambers $k$ $l$ by the same operation.

G', H', and I' are short rods connected by shafts $q$ to the rods G H I, respectively, through the links $r$, which are pivoted to the short rods G', H', and I' and the shafts $q$. This arrangement renders it possible for operating the mechanism when the engine is traveling tender first.

S is a plate or board colored red, which is fixed in the casing in front of the opening R to exhibit the danger signal when the plate Q is not operated to indicate "line clear."

Now supposing that a fresh roll of paper is placed in the casing and the train about to start upon its journey, and for the purpose of illustrating the action of the apparatus I will describe the same as occurring between two stations—say "Moorgate street" and "Aldersgate"—and it is assumed that there are three signals between each station—i. e., "distant," "semaphore," and "home" signals. At the opening P will be exhibited "Moorgate," and on the signalman operating the "home" or starting signal to indicate "line clear" the camber $l$ will be lifted and operate the rod H to indicate to the driver that the line is clear on which he starts the train, and at some distance away G will be actuated by the fixed camber $j$ for revolving the roller C to move the paper to exhibit "Aldersgate, distant," the rod G returning to its normal position by its spring M. Now assuming the "Aldersgate, distant" signal has been operated to "line clear," the signalman will have on the pulling of his lever for actuating the signal operated the cambers $k$ $l$ to lower the camber $k$ and place $l$ in the path of the rod H, so that when the train reaches the camber $l$ the rod H will be operated and the board Q or "line-clear" signal exhibited at the opening R to indicate to the driver that the line is clear to the next signal, a mark also being made by the inker U at the side of the printing "Aldersgate, distant" to record that the line was clear, the board Q being retained in the exhibit position by the latch-plate S, as before explained. The train passes the "distant" signal and goes on until it reaches the next camber $j$, which actuates the rod G to indicate to the driver in the manner already explained that he is approaching another signal, the indication this time being "Aldersgate, semaphore." This actuation of the rod G causes the latch-plate S to be acted upon to release the board Q and rod H, which return to their normal condition ready for a fresh operation, the danger-board S' now being exhibited at the opening R. The train passes along until it reaches the camber $k$, which, if the line is clear, has been lowered, so that the train can pass on until the camber $l$ is reached, and this having been raised, as with the "distant" signal, actuates the rod H to indicate "line clear" for the train to continue its journey until the "semaphore" signal has been passed and the next camber $j$ reached for operating the roller C to indicate "Aldersgate, home" and release the "line-clear" signal Q and rod H, and, assuming the train is to stop at Aldersgate, the "home" signal will be at "danger," and in consequence of this signal not having been operated the camber $k$ will have been raised to be in the path of the rod H and the camber $l$ lowered, the camber $k$ acting upon the rod I to mark the paper that the line was blocked, the danger-indicator S' still being exhibed, so that the driver will at once pull up into the station for the rod H to be again acted upon by the camber $l$ when the signalman operates the "home" or starting signal to "line clear" to indicate to the driver that he can start, the apparatus being acted upon in the same way during the next section, and so on.

Should the driver after having passed the camber $k$ when raised not pull up at the camber $l$, the same will be known by the fact that only the lever X will mark the paper, whereas if he pull up at the camber $l$ the operation of the signal for restarting the train will raise the camber $l$ to operate the rod H, this by the lever U marking the paper at the side of the previous mark, this stamping not being viewed by the driver.

As will be understood, the arrangement of the cambers may be varied to suit the particular features of the road, and in some cases the camber $k$ may be of undulating or wavy form to ring the bell the requisite number of times to indicate to the driver by the number of beats the number of whistles for the signal he requires, this being specially applicable for junctions. Thus by this invention the driver of a locomotive-engine or a guard, or both, can, whether in fine or foggy weather or dark nights, ascertain during the travel of the train the name of the station, block-box, or set of signals he is passing and also the gradient of the road and whether such signal is at "danger" or "line clear," the position of the signals being also recorded upon the paper set that the superintendent or other official on removing the roll of paper at the end of the journey can ascertain whether the driver passed any signal when at "danger."

What I claim, and desire to secure by Letters Patent, is—

1. In a railway signaling apparatus, an indicating means, recording mechanism for marking said indicating means, a series of rods for operating said indicating means and recording mechanisms, in combination with a series of cambers arranged in the railway-track for operating said rods.

2. In a railway signaling apparatus, an indicating means, a pair of spring-actuated marking-levers for recording a designating character upon said said indicating means, a series of rods for operating said means and levers, in combination with a series of cambers arranged in a track-bed for operating said rods.

3. In a railway signaling apparatus, an indicating means, a pair of spring-actuated marking-levers for recording a designating character upon the said indicating means, an alarm-indicator, a series of rods for operating said means, levers and alarm-indicator, in combination with a series of cambers arranged in a track-bed for operating said rods.

4. In a railway signaling apparatus, an indicating means, means for recording a designatory character upon said indicating means, an alarm-indicator, a series of rods for operating said indicating means, recording means and alarm-indicator, in combination with a series of cambers arranged in a track-bed for operating said rods.

5. In a railway signaling apparatus, an indicating means, a spring-actuated rod for intermittently operating said means, a spring-actuated marking-lever, a spring-actuated rod for imparting movement to said lever to permit of the same recording a designatory character upon said indicating means, means for locking said last-named rod in position during the recording operation of the said lever, means for releasing said rod after the recording operation of said lever, a spring-actuated marking-lever, a spring-actuated rod for retaining said lever in an inoperative position, and suitable operating means for the said rods.

6. In a railway signaling apparatus, an indicating means, means for recording a designatory character upon said indicating means, a series of rods for operating said indicating and recording means, and suitable operating means for the said rods.

7. In a railway signaling apparatus, an indicating means, a spring-actuated rod for intermittently operating said means, means for recording a designatory character upon said indicating means, a pair of spring-actuated rods for operating said recording means, and a suitable operating means for the said rods.

In testimony whereof I have hereunto set my hand in presence of two subscribing witnesses.

HENRY SMITH.

Witnesses:
 RICHARD CORE GARDNER,
 WM. O. BROWN.